United States Patent
Goldstein et al.

(10) Patent No.: US 9,536,439 B1
(45) Date of Patent: Jan. 3, 2017

(54) CONVEYING QUESTIONS WITH CONTENT

(75) Inventors: Douglas S. Goldstein, Riverdale, NY (US); Ajay Arora, New York, NY (US); Douglas Hwang, New York, NY (US); Guy A. Story, Jr., New York, NY (US); Shirley C. Yang, New York, NY (US)

(73) Assignee: Audible, Inc., Newark, NJ (US)

( * ) Notice: Subject to any disclaimer, the term of this patent is extended or adjusted under 35 U.S.C. 154(b) by 681 days.

(21) Appl. No.: 13/535,260

(22) Filed: Jun. 27, 2012

(51) Int. Cl.
  G09B 7/00 (2006.01)
(52) U.S. Cl.
  CPC ........................ G09B 7/00 (2013.01)
(58) Field of Classification Search
  USPC ................ 434/322, 323, 156, 157
  See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motoyama | |
| 6,260,011 B1 | 7/2001 | Heckerman et al. | |
| 6,356,922 B1 | 3/2002 | Schilit et al. | |
| 6,766,294 B2 | 7/2004 | MacGinite et al. | |
| 6,912,505 B2 | 6/2005 | Linden et al. | |
| 7,107,533 B2 | 9/2006 | Duncan et al. | |
| 7,231,351 B1 | 6/2007 | Griggs | |
| 8,106,285 B2 | 1/2012 | Gerl et al. | |
| 8,109,765 B2 * | 2/2012 | Beattie et al. | 434/178 |
| 8,131,545 B1 | 3/2012 | Moreno et al. | |
| 8,131,865 B2 | 3/2012 | Rebaud et al. | |
| 8,442,423 B1 | 5/2013 | Ryan et al. | |
| 8,517,738 B2 * | 8/2013 | Sheehan et al. | 434/169 |
| 8,548,618 B1 | 10/2013 | Story, Jr. et al. | |
| 8,577,668 B2 | 11/2013 | Rosart et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 2002/0002459 A1 | 1/2002 | Lewis et al. | |

(Continued)

FOREIGN PATENT DOCUMENTS

CN  103988193 A  8/2014
EP  2689346     1/2014

(Continued)

OTHER PUBLICATIONS

Beattie, Valerie et al., "Reading Assistant: Technology for Guided Oral Reading", Scientific Learning, Apr. 10, 2012, 5 pages.

(Continued)

*Primary Examiner* — Kesha Frisby
(74) *Attorney, Agent, or Firm* — Knobbe, Martens, Olson & Bear, LLP

(57) ABSTRACT

A service for conveying questions with an item of content is disclosed. The content question service may analyze a portion of an item of content, select a question task, and then generate a question about the portion of the item of content using the selected question task. The content question service may receive a user's response to the conveyed question, analyze the response, and track the user's skill level for the selected question task.

29 Claims, 9 Drawing Sheets

(56) References Cited

U.S. PATENT DOCUMENTS

| | | |
|---|---|---|
| 2002/0007349 A1 | 1/2002 | Yuen |
| 2002/0041692 A1 | 4/2002 | Seto et al. |
| 2002/0116188 A1 | 8/2002 | Amir et al. |
| 2003/0061028 A1 | 3/2003 | Dey et al. |
| 2003/0077559 A1* | 4/2003 | Braunberger et al. ........ 434/322 |
| 2003/0083885 A1 | 5/2003 | Frimpong-Ansah |
| 2003/0115289 A1 | 6/2003 | Chinn et al. |
| 2004/0261093 A1 | 12/2004 | Rebaud et al. |
| 2006/0014129 A1* | 1/2006 | Coleman et al. ............ 434/322 |
| 2006/0148569 A1 | 7/2006 | Beck |
| 2007/0016314 A1 | 1/2007 | Chan et al. |
| 2007/0061487 A1 | 3/2007 | Moore et al. |
| 2007/0136459 A1 | 6/2007 | Roche et al. |
| 2007/0276657 A1 | 11/2007 | Gournay et al. |
| 2007/0281285 A1* | 12/2007 | Jayaweera .................... 434/156 |
| 2008/0177822 A1 | 7/2008 | Yoneda |
| 2008/0294453 A1 | 11/2008 | Baird-Smith et al. |
| 2009/0047003 A1 | 2/2009 | Yamamoto |
| 2009/0136213 A1 | 5/2009 | Calisa et al. |
| 2009/0210213 A1 | 8/2009 | Cannon et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0305203 A1 | 12/2009 | Okumura et al. |
| 2009/0319273 A1 | 12/2009 | Mitsui et al. |
| 2010/0042682 A1 | 2/2010 | Kaye |
| 2010/0042702 A1 | 2/2010 | Hanses |
| 2010/0064218 A1 | 3/2010 | Bull et al. |
| 2010/0070575 A1 | 3/2010 | Bergquist et al. |
| 2010/0225809 A1 | 9/2010 | Connors et al. |
| 2010/0279822 A1 | 11/2010 | Ford |
| 2010/0286979 A1 | 11/2010 | Zangvil et al. |
| 2010/0287256 A1 | 11/2010 | Neilio |
| 2011/0067082 A1 | 3/2011 | Walker |
| 2011/0087802 A1 | 4/2011 | Witriol et al. |
| 2011/0119572 A1 | 5/2011 | Jang et al. |
| 2011/0153330 A1 | 6/2011 | Yazdani et al. |
| 2011/0177481 A1 | 7/2011 | Haff et al. |
| 2011/0184738 A1 | 7/2011 | Kalisky et al. |
| 2011/0191105 A1 | 8/2011 | Spears |
| 2011/0231474 A1 | 9/2011 | Locker et al. |
| 2011/0246175 A1 | 10/2011 | Yi et al. |
| 2011/0288861 A1 | 11/2011 | Kurzweil et al. |
| 2011/0288862 A1 | 11/2011 | Todic |
| 2011/0296287 A1 | 12/2011 | Shahraray et al. |
| 2012/0030288 A1 | 2/2012 | Burckart et al. |
| 2012/0109640 A1 | 5/2012 | Anisimovich et al. |
| 2012/0150935 A1 | 6/2012 | Frick et al. |
| 2012/0158706 A1 | 6/2012 | Story, Jr. et al. |
| 2012/0166180 A1 | 6/2012 | Au |
| 2012/0197998 A1 | 8/2012 | Kessel et al. |
| 2012/0245720 A1 | 9/2012 | Story, Jr. et al. |
| 2012/0246343 A1 | 9/2012 | Story, Jr. et al. |
| 2012/0310642 A1 | 12/2012 | Cao et al. |
| 2012/0315009 A1 | 12/2012 | Evans et al. |
| 2012/0324324 A1 | 12/2012 | Hwang et al. |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0130216 A1 | 5/2013 | Morton et al. |
| 2013/0257871 A1 | 10/2013 | Goldstein et al. |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0223272 A1 | 8/2014 | Arora et al. |
| 2014/0250219 A1 | 9/2014 | Hwang |
| 2015/0026577 A1 | 1/2015 | Story et al. |

FOREIGN PATENT DOCUMENTS

| | | |
|---|---|---|
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 1/2007 |
| NZ | 532174 | 11/2012 |
| WO | WO 2006/029458 A1 | 3/2006 |
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Levinson, S.E. et al., "Continuous Speech Recognition from a Phonetic Transcription", Acoustics, Speech, and Signal Processing, Apr. 1990, pp. 190-199.

Roub, Paul, "I'll Buy an E-book Reader When . . . ", Nov. 16, 2007, available at: http://roub.net/blahg/2007/11/16/ill-buv-an-eboo/ (accessed: Sep. 6, 2012), 2 pages.

Ryan et al., U.S. Appl. No. 12/360,044, filed Jan. 26, 2009, entitled "Testing Within Digital Media Items."

Story Jr. et al., U.S. Appl. No. 12/881,021, filed Sep. 13, 2010, entitled "Systems and Methods for Associating Stories with Related Referents".

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Fabio Vignoli et al., Aug. 7-10, 1999, A Text-Speech Synchronization Technique With Applications to Talking Heads, Auditory-Visual Speech Processing, ISCA Archive.

Yardena Arar, Jan. 7, 2010, Blio E-Book Platform: No Reader (Yet), But Great Graphics.

International Search Report re International Application No. PCT/US13/33935 mailed on Jul. 3, 2013.

International Search Report issued for PCT/US12/30198 mailed on Jun. 20, 2012, 16 pages.

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

International Search Report issued in connection with International Patent Application No. PCT/USI2/30186 mailed on Jun. 20, 2012, 12 pages.

Extended Search Report in European Application No. (12761404.8) dated Jan. 26, 2015.

Office Action in Japanese Application No. 2014-501254 dated Oct. 14, 2014.

International Preliminary Report on Patentability issued in connection with International Patent Application No. PCT/US12/30198 mailed on Jan. 30, 2014, 8 pages.

Office Action in Japanese Application No. 2014-501257 dated Aug. 25, 2014.

International Search Report and Written Opinion in PCT/US2013/042903 mailed Feb. 7, 2014.

International Preliminary Report on Patentability in PCT/US2013/042903 mailed Dec. 2, 2014.

International Search Report issued in connection with International Application No. PCT/US13/53020 mailed on Dec. 16, 2013.

International Preliminary Report issued in connection with International Application No. PCT/US13/53020 mailed on Feb. 12, 2015.

(56) References Cited

OTHER PUBLICATIONS

International Search Report and Written Opinion in PCT/US2014/014508 mailed Jun. 25, 2014.
"Flesch—Kincaid readability tests—Wikipedia", as archived on Jun. 28, 2013, available at https://web.archive.org/web/20130628060131/http://en.wikipedia.org/wiki/Flesch%E2%80%93Kincaid_readability_tests.
"Gunning fog index—Wikipedia", as archived on Jan. 28, 2012, available at https://web.archive.org/web/20120128120954/http://en.wikipedia.org/wiki/Gunning_fog_index.

* cited by examiner

CONVEYING QUESTIONS WITH CONTENT

BACKGROUND

Generally described, computing devices may convey items of digital content to users. For example, computing devices may visually convey items of content such as images, electronic books, electronic periodicals, movies, television programs, multi-media content, and portions thereof on an electronic screen or touchscreen. Computing devices may also direct output through headphones or speakers to convey items of audible content such as audiobooks, songs, movies, television programs, multi-media content, and portions thereof.

In some instances, it may desirable to determine how well a user of an item of content understands certain aspects of the content. For example, a teacher or parent may wish to determine how well his or her students or children understand an electronic book or audiobook. In current approaches, manually generated and distributed questions are used for testing content comprehension by presenting these questions to a user of the item of content. These questions may be collected into banks or pools. In some approaches, heuristics are programmed to select questions from the question banks and adapt to a user's responses to the questions. For example, a user that answers many questions correctly may be given more difficult questions from the question bank.

One limitation of current approaches is that the process of manually generating questions can be difficult, time-consuming, and expensive. For example, someone wishing to generate questions manually about an item of content typically consumes the item of content and then writes questions about the content. Moreover, approaches that rely on pre-generated questions often cannot be tailored to the goals of an individual user of the item of content. For example, a user may need assistance in improving one reading skill, but may be strong in other reading skills. A question bank that only has a few questions directed to the reading skill that needs improvement may prove inadequate to help the user improve that reading skill. Additionally, a user may exhaust all of the questions in a question bank. These limitations and others are not merely limited to educational environments, but may apply generally in all contexts in which questions may be conveyed about content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
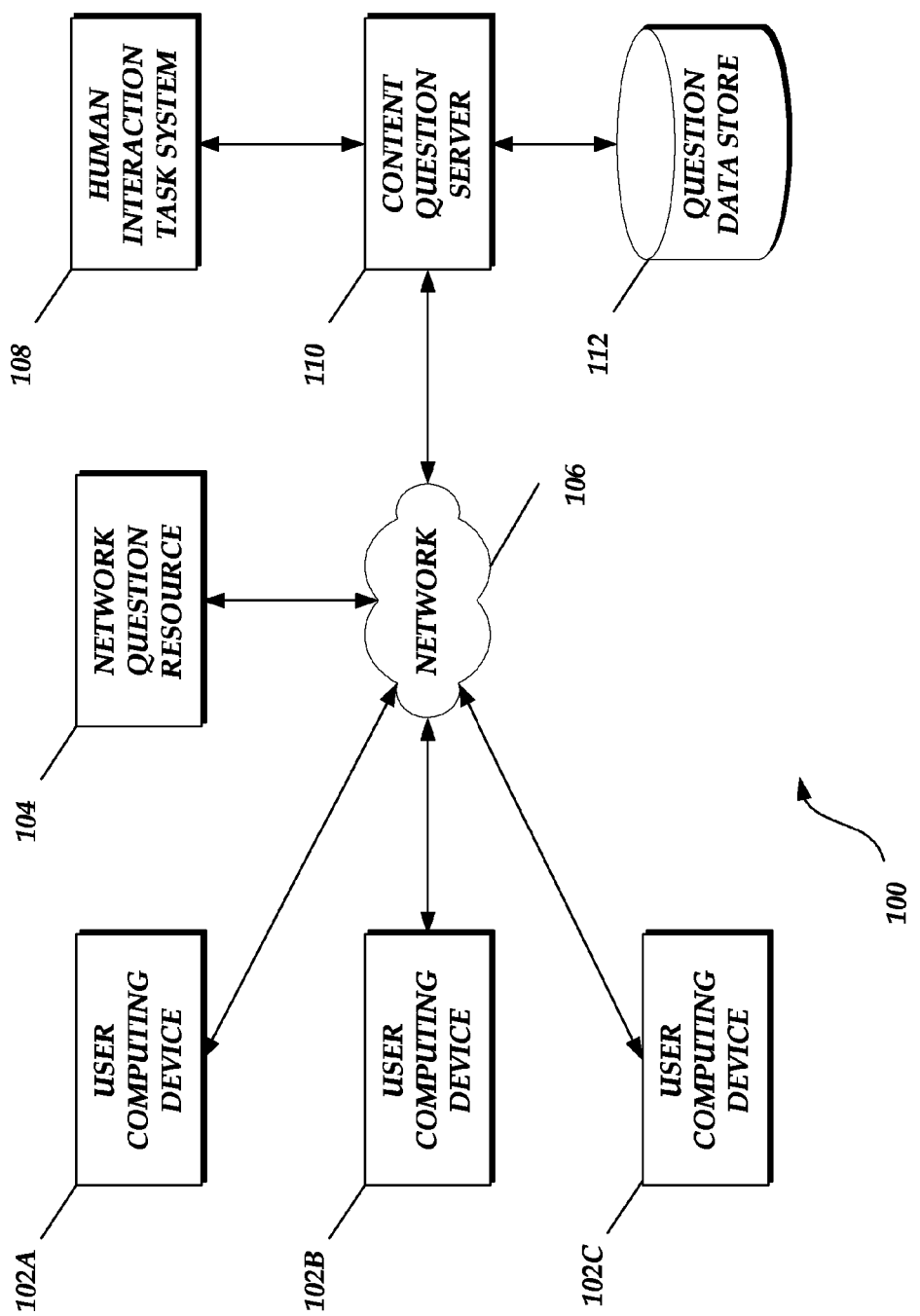
FIG. 1 is a schematic diagram of an illustrative network environment in which a content question service may operate.

Generally described, aspects of the present disclosure are directed to conveying dynamically generated questions with an item of content. Accordingly, a computer-implemented content question service is disclosed. In one embodiment, the content question service analyzes a portion of an item of content using natural language techniques or other methods of analyzing the item of content. A question may then be generated based on the analyzed portion of the item of content, and conveyed with the portion of the item of content. The content question service may then receive a user's response to the question, analyze the response, and optionally convey the next portion of the item of content.

The content question service may analyze items of content to determine what, if any, question subjects may be present in the item of content. Generally described, a question subject may be a word, phrase, sentence, mathematical expression, number, image, video clip, audio clip, or other discrete entity in a portion of an item of content about which a question may be asked. Question subjects may be labeled or tagged as such in the item of content, e.g., they may be labeled by the content question service or by the author or publisher of the item of content. Question subjects may also be identified with machine techniques, such as named entity extraction, natural language processing, semantic analysis, and other known techniques. In one embodiment, a question subject is a noun in the portion of the item of content, and the answer to the generated question is an adjective that describes the noun. For example, a page in an electronic book may read, "The Rhinos were wearing their yellow helmets." The question subject may be "yellow helmets," and the question might be, "What color helmets are the Rhinos wearing?" The answer to this question would be "yellow."

The content question service may generate questions by selecting one or more question tasks, and then using the selected question tasks to generate a question about a portion of an item of content. Generally described, a question task relates to a particular skill that is tested by the question to be generated. Question tasks may span a variety of areas of knowledge, such as reading comprehension, language arts, foreign languages, geography, science, mathematics, history, or any other area of knowledge. Each area may include several question tasks. For example, the mathematics area may include question tasks including addition, subtraction, division, multiplication, counting money, telling time, and the like. The language arts area may include question tasks such as identifying synonyms or antonyms of a word; identifying the definition of a vocabulary word; classifying sentences; and other tasks.

The questions generated from the selected question tasks may take on one or more of any number of forms. For example, the content question service may generate or obtain multiple choice, true/false, fill-in-the-blank, short answer, free response, essay, or other forms of questions about the item of content. For example, a question may include a mathematics question task asking the user to find the sum of two plus two. For a multiple choice question form, the user may be asked to select between responses corresponding to three, four, and five. The same question may also be asked as a short answer question form, without choices provided to the user, or a true/false question, wherein the user may be asked, "True or False: two plus two equals four."

The content question service may also distribute the questions that it generates or otherwise obtains. This implementation may advantageously be employed in educational or training environments. For example, a teacher may have assigned his or her students an electronic book or audiobook to read on their user computing devices. The teacher may use the content question service to select computing devices associated with his or her students to receive questions from the content question service. The content question service may generate questions about the audiobook or electronic book assigned to the students, and may cause the students' user computing devices to convey those questions as the students consume the electronic book or audiobook.

The content question service may also obtain a user's response to a question. For example, the content question service may receive user input indicating a response to the question. This input may be in a variety of forms. In some embodiments, a user interacts with a visual user interface element displayed on a display screen or touchscreen of his or her user computing device to indicate his or her response. In other embodiments, a user may type his or her answer using a hardware or software keyboard provided with his or her user computing device. In yet further embodiments, the user may speak, sing, or otherwise convey his or her answer through an audio input of the user computing device, such as a microphone. Still other ways of receiving user responses to questions are possible and within the scope of the disclosure. The user's response may be processed to determine, for example, if the user has answered the question, and if so, if the user has answered the question correctly.

The content question service may also track the progress of a user in answering questions conveyed by the content question service. For example, the content question service may determine how well a user has performed with one or more particular question tasks. The user's skill level with each question task may be collected into a user profile detailing how well the user has performed on the question tasks. The content question service may then present to a user information about his or her skill level with a particular question task, and may optionally compare that skill level to the skill level of other users in the user's peer group, to an educational standard, or to some other skill level. The content question service may adapt its selection of question tasks based on the user's skill level. For example, the content question service may determine that a user is weak in one particular question task, and may select that question task for future questions to be conveyed to the user for extra practice. Alternately, the content question service may determine that a user has performed exceptionally well for a particular question task, and may not select that question task for future questions to be conveyed, as the user may not need any practice on question tasks in which he or she is proficient.

Turning to FIG. 1, an illustrative network environment 100 is shown. The network environment 100 may include one or more user computing devices 102A-102C, a network question resource 104, a network 106, a human interaction task system 108, a content question server 110, and a question data store 112. The constituents of the network environment 100 may be in communication with each other either locally or over the network 106.

Each of the one or more user computing devices 102A-102C may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing devices 102A-102C may generally be capable of conveying content and questions about content to a user of the user computing devices 102A-102C. For example, the user computing devices 102A-102C may be capable of playing audio content by directing audible output through speakers, headphones, or the like. The user computing devices 102A-102C may also be capable of displaying images, text, or video content on a display screen. The user computing devices 102A-102C may also be capable of communicating over the network 106, for example, to obtain questions from the network question resource 104 or the content question server 110. The user computing devices 102A-102C may also a include non-transitory computer-readable storage medium drive that can store items of content, questions about items of content, and/or information about a user, such as the user's skill level or progress toward certain goals.

The network question resource 104 may host or maintain questions and their responses that may be accessed over the network 106 by the one or more user computing devices 102A-102C or by the content question server 110. The network question resource 104 may include one or more electronic data stores to host or maintain questions and responses thereto. The network question resource 104 may include questions or responses generated, suggested, or hosted by, for example, a network-based social community; a network-based social content aggregator; a network-based content hosting community; a network-based content delivery platform; or a combination thereof. Upon request, the network question resource 104 may transmit a requested question or response to a questioning computing device, such as the user computing device 102 or the content question server 110.

The network 106 may be any wired network, wireless network or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment to assist the content question server 110. Generally described, the human interaction task system 108 is a computerized system including one or more computing devices that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content question service directs a computing device of the human interaction task system 108 to convey a portion of an item of content to a human worker of the human interaction task system 108. The human worker may then be asked to perform a HIT about the portion of the item of content, such as to identify a question subject in the portion of the item of content; to determine the difficulty level of the item of content; to generate a question about a portion of the item of content; to answer a question generated about the item of content; or to identify educational or other standards that may be used in the selection of question tasks. The human worker of the human interaction task system 108 may volunteer to respond to these and other tasks and to communicate other information about the item of content to the content question server 110.

The content question server 110 is a computing device that may perform a variety of tasks to provide questions to be conveyed with an item of content. For example, the content question server 110 may receive a request to provide questions (e.g., by generating questions or by obtaining questions from the network question resource 104) for an item of content from a user computing device 102A-102C over the network 106. In response to the request, the content question server 110 may transmit one or more questions about the item of content to the one or more user computing devices 102A-102C. Additional operations of the content question server 110, such as distributing questions, adapting to user skill levels, and tracking a user's progress, are described with respect to FIG. 2.

The content question server 110 may be in communication with a question data store 112. The question data store 112 may electronically store questions generated for use with one or more items of content. These stored questions may have been generated automatically by the content question service through a question generation routine or may have been generated and provided by a user of the content question service, an educator, an author or publisher of the item of content, or by some other individual or organization. In some instances, these questions may include ratings such as user ratings, which may reflect the satisfaction level of users with the question (e.g., may reflect a user's opinions on the clarity or appropriateness of the question). In some embodiments, the question data store 112 stores the correct responses to these questions as well for use in determining whether a user has answered a conveyed question correctly. The question data store 112 may also store an electronic knowledge base that includes correct answers to questions that may be generated by the content question service. For example, for geography questions, the question data store may store information about the capitals of states or countries. In some embodiments, the content data store 112 further stores one or more items of content.

The question data store 112 may be embodied in hard disk drives, solid state memories, and/or any other type of non-transitory, computer-readable storage medium accessible to the content question server 110. The question data store 112 may also be distributed or partitioned across multiple local and/or remote storage devices as is known in the art without departing from the spirit and scope of the present disclosure.

The user computing devices 102A-102C and content question server 110 may each be embodied in a plurality of components, each executing an instance of the respective content user computing device 102 and content question server 110. A server or other computing system implementing the user computing devices 102A-102C and content question server 110 may include a network interface, memory, processing unit, and computer readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing devices 102A-102C and content question server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content question server 110 may be represented in a single physical server or, alternatively, may be split into multiple physical servers. The entire content question service may also be represented in a single user computing device, such as one of the user computing devices 102A-102C.

Figure 2:
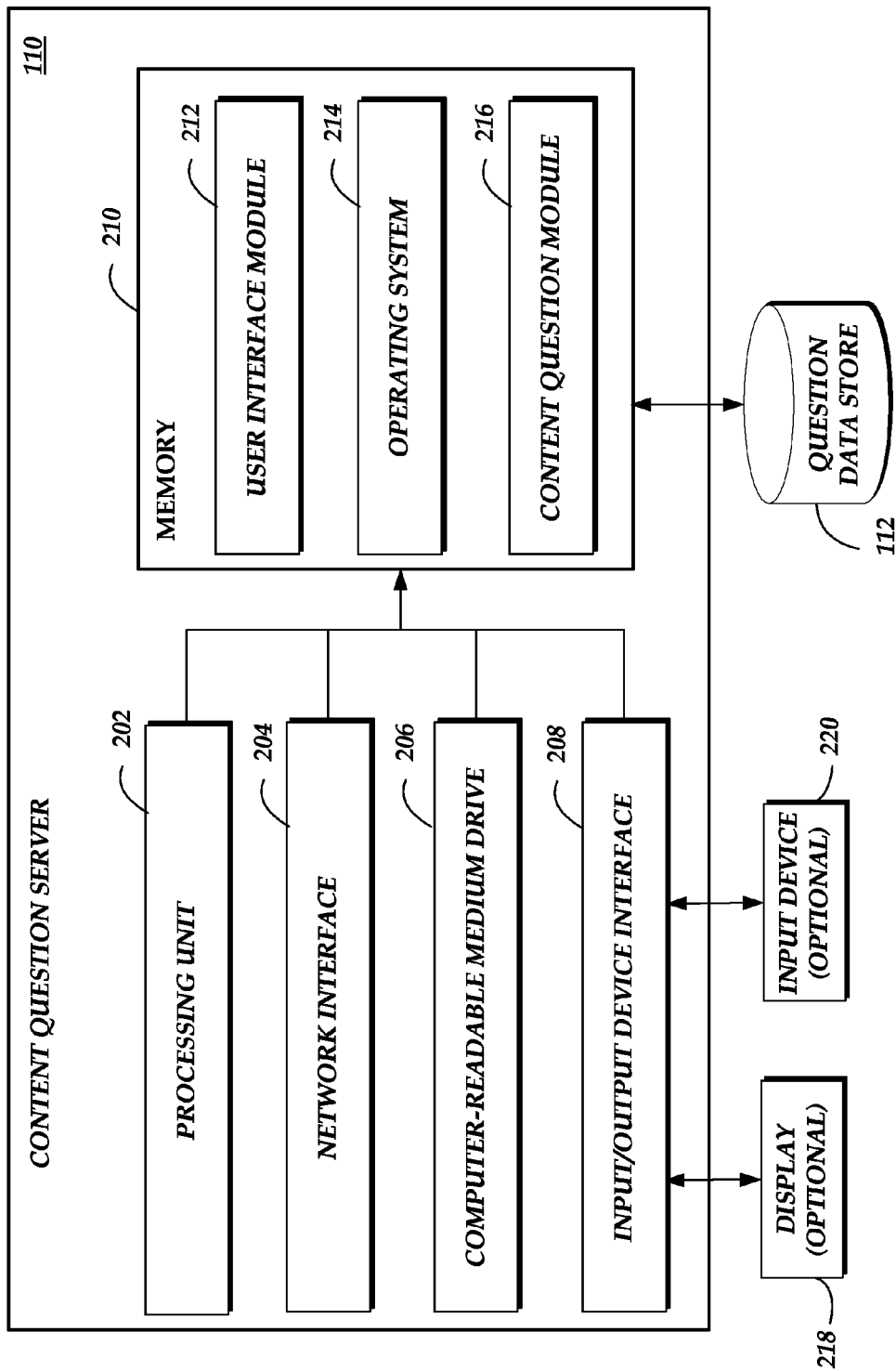
FIG. 2 is a schematic diagram of an illustrative content question server.

FIG. 2 is a schematic diagram of the content question server 110 shown in FIG. 1. The content question server 110 includes an arrangement of computer hardware and software components that may be used to implement the content question service. FIG. 2 depicts a general architecture of the content question server 110 illustrated in FIG. 1. Those skilled in the art will appreciate that the content question server 110 may include more (or fewer) components than those shown in FIG. 2. It is not necessary, however, that all of these generally conventional components be shown in order to provide an enabling disclosure.

The content question server 110 includes a processing unit 202, a network interface 204, a computer-readable medium drive 206, and an input/output device interface 208, all of which may communicate with one another by way of a communication bus. As illustrated, content question server 110 is optionally associated with, or in communication with, an optional display 218 and an optional input device 220. The display 218 and input device 220 may be used in embodiments in which users interact directly with the content question server 110, such as an integrated in-store kiosk, for example. In other embodiments, the display 218 and input device 220 may be included in one or more of the user computing devices 102A-102C shown in FIG. 1. The network interface 204 may provide content question server 110 with connectivity to one or more networks or computing systems. The processing unit 202 may thus receive information and instructions from other computing systems (such as one or more of the user computing devices 102A-102C) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content question service. The memory 210 generally includes RAM, ROM and/or other persistent or non-transitory computer-readable storage media. The memory 210 may store an operating system 214 that provides computer program instructions for use by the processing unit 202 in the general administration and operation of the content question server 110. The memory 210 may further include other information for implementing aspects of the content question service. For example, in one embodiment, the memory 210 includes a user interface module 212 that facilitates generation of user interfaces (such as by providing instructions therefor) for display upon a computing device such as one or more of the user computing devices 102A-102C. For example, a user interface may be displayed via a navigation interface such as a web browser installed on one or more of the user computing devices 102A-102C. In addition, memory 210 may include or communicate with the question data store 112.

In addition to the user interface module 212, the memory 210 may include a content question module 216 that may be executed by the processing unit 202. In one embodiment, the content question module 216 implements the content question service. For example, the content question module 216 may be used to generate or select questions to be conveyed with an item of content; to direct one or more of the user computing devices 102A-102C to convey a question with an item of content; to collect and track user responses to questions conveyed with an item of content; to maintain user profiles detailing a user's skill level with one or more question tasks; to receive questions generated by the human interaction task system 108; and other tasks.

Those skilled in the art will recognize that in some embodiments, the content question service is implemented partially or entirely by the user computing device 102. Accordingly, one or more of the user computing devices 102A-102C may include a content question module 216 and other components that operate similarly to the components illustrated as part of the content question server 110, including a processing unit 202, network interface 204, computer readable medium drive 206, input/output interface 208, memory 210, user interface module 212, and so forth.

Figure 3:
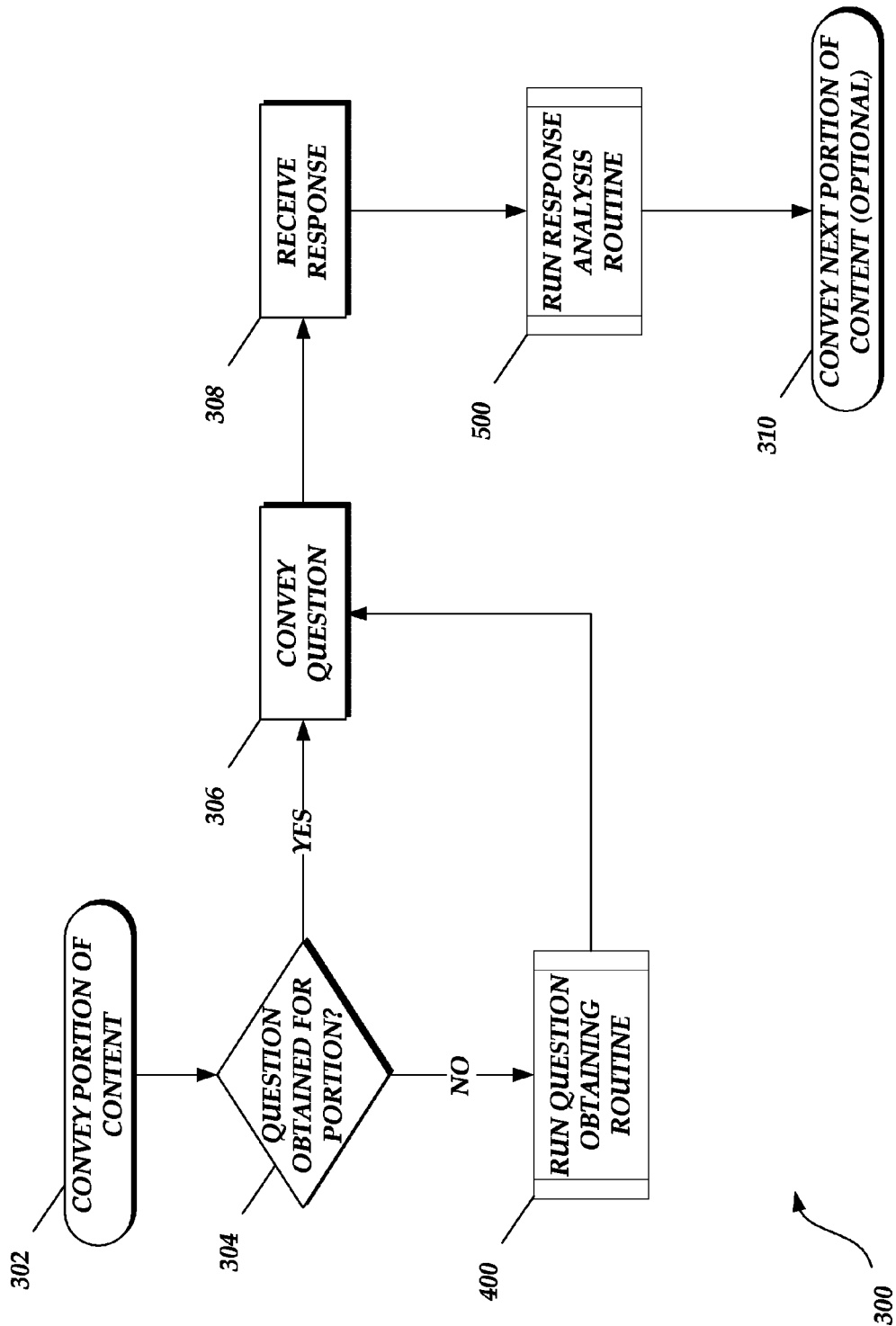
FIG. 3 is a flow diagram depicting an illustrative routine for conveying a question with a portion of an item of content and for receiving a user's response to the question.

FIG. 3 depicts an illustrative routine by which the content question service may cause questions to be conveyed with content. In block 302, a portion of content may be conveyed. For example, a user computing device may convey the portion of the item of content by displaying visual content (e.g., portions of electronic books, images, videos, television programs, etc.) on a display screen, by playing audio content (e.g., portions of audiobooks, songs, audio lectures, etc.), by directing audio output through speakers or headphones, or both (e.g., for multimedia content that includes both audio and visual content).

In block 304, the content question service may determine whether a question has been obtained for the portion of the item of content conveyed in block 302. Questions may be obtained for a portion of an item of content before the portion is conveyed, substantially while the portion of the item of content is being conveyed, or after the portion of the item of content has been conveyed. If no question has been obtained for the portion of the item of content, a question may be obtained by following the question obtaining routine 400, shown in and described with respect to FIG. 4A and FIG. 4B. More details on the types of questions that may be conveyed are also shown in and described with respect to FIG. 4A and FIG. 4B. As also discussed further with respect to FIG. 4A and FIG. 4B, a question may be obtained either by generating a question or by accessing a previously generated question.

If a question has been obtained for a portion of the item of content (either in advance or dynamically through the operation of question obtaining routine 400), the question may be conveyed in block 306. Questions may be conveyed by a user computing device in several ways. In some embodiments, a user computing device audibly conveys a question. For example, a speech synthesizer may be used to generate an audio question to be played back to the user through speakers or headphones. In other embodiments, a user computing device conveys a question as visual content on a display screen. For example, a question may be posed as text, an image, a video clip, an animation, or in some other visual format. Questions may also be conveyed in one or more than one format. For example, a user computing device may convey a question that includes both a visual component and an audio component, such as a multimedia clip. Those skilled in the art will recognize that the question need not be conveyed in the same way as the portion of the item of content. For example, a user computing device conveying an electronic book may convey a question as audio through speakers or headphones, or a user computing device conveying an audiobook may convey a question as text on a display screen. In embodiments of the content question service that may help a user learn a foreign language, the question may optionally be machine-translated into the language the user desires to learn and conveyed in that language.

In block 308, a user's response to the question may be received by the content question service. The user's response may be received at a user computing device. For example, the user may interact with the user computing device to provide a response to a question. In some embodiments, the user may interact with an input device associated with the user computing device to provide a response. The user may direct input through a mouse, keyboard, touchscreen, or other input device to interact with a user interface configured to receive the user's response. For example, the content question service may display on a touchscreen a question and several software controls indicating response choices for that question (e.g., a multiple choice question). The user may tap one of the software controls to indicate his or her response. In another example, a free-response question may be conveyed (e.g., a short answer or essay question). The user may type an answer on a software or hardware keyboard, or write on a touchscreen with a stylus or finger to provide a response. In yet another example, the user may speak an answer into a microphone of the user computing device. Speech recognition techniques known in the art may be used to convert the user's spoken response into data for further processing by the content question service. For example, the user may be asked to spell a word out loud or to sound out a word. The user may speak each letter of the word, with the spoken letters received through the microphone of the user computing device. Still other ways of receiving a user response through an input device are possible. In a still further example, the user may physically manipulate the user computing device itself as a response. For example, the user computing device may include an accelerometer, gyroscope, infrared proximity sensor, or other hardware or software for detecting motion.

A response received by a user computing device may be transmitted over the network shown in FIG. 1. For example, a user may interact with a user computing device as described above to provide an answer, and that answer may be received by the user computing device. When the user computing device receives the answer, it may optionally provide the answer to another user computing device or to the content question server.

The content question service may analyze and process the response that it receives in block 500. Generally described, the response analysis routine 500 may be followed to determine if the response received in block 308 is correct or incorrect. The response analysis routine 500 may also be followed to track a user's progress towards goals for a particular question task or to measure the user's skill level for various question tasks. The response analysis routine is shown in and described in further detail with respect to FIG. 5. In some embodiments, this analysis is performed on a user computing device. In other embodiments, this analysis is performed on the content question server.

In block 310, a subsequent portion of the item of content may be conveyed. However, in certain embodiments, the subsequent portion of the item of content may be prevented from being conveyed, depending on a user's response to the question conveyed in block 306. For example, in some embodiments, the next portion of the item of content is not conveyed unless the response analysis routine 500 determines that the response received in block 308 is substantially correct. For example, say that the question obtained for the portion of the item of content tests a student's geography skills about a state or country mentioned in the item of content. For example, the question conveyed in block 306 might be, "What is the capital of California?" If the content question service receives a response corresponding to "Sacramento" in block 308, the response analysis routine 500 may determine that the received response is the correct response, and the next portion of the item of content may be conveyed in block 310. If the response received in block 308 is incorrect (perhaps the user responded "Los Angeles"), the response analysis routine 500 may determine that the received response is an incorrect response, and may not convey the next portion until the correct response is received.

In other embodiments, the next portion of the item of content may be conveyed so long as any response is received by the content question service in block 308. For example, the question conveyed may be a free-response question with no single correct answer. If any response has been received in block 308, the next portion of the item of content may be conveyed. Alternately, the content question service may allow a user to progress through the item of content even with an incorrect response, and accordingly the next portion of the item of content may be conveyed in block 310 even if the response analysis routine 500 determines that the response received in block 308 is incorrect or otherwise deficient.

Figure 4A:
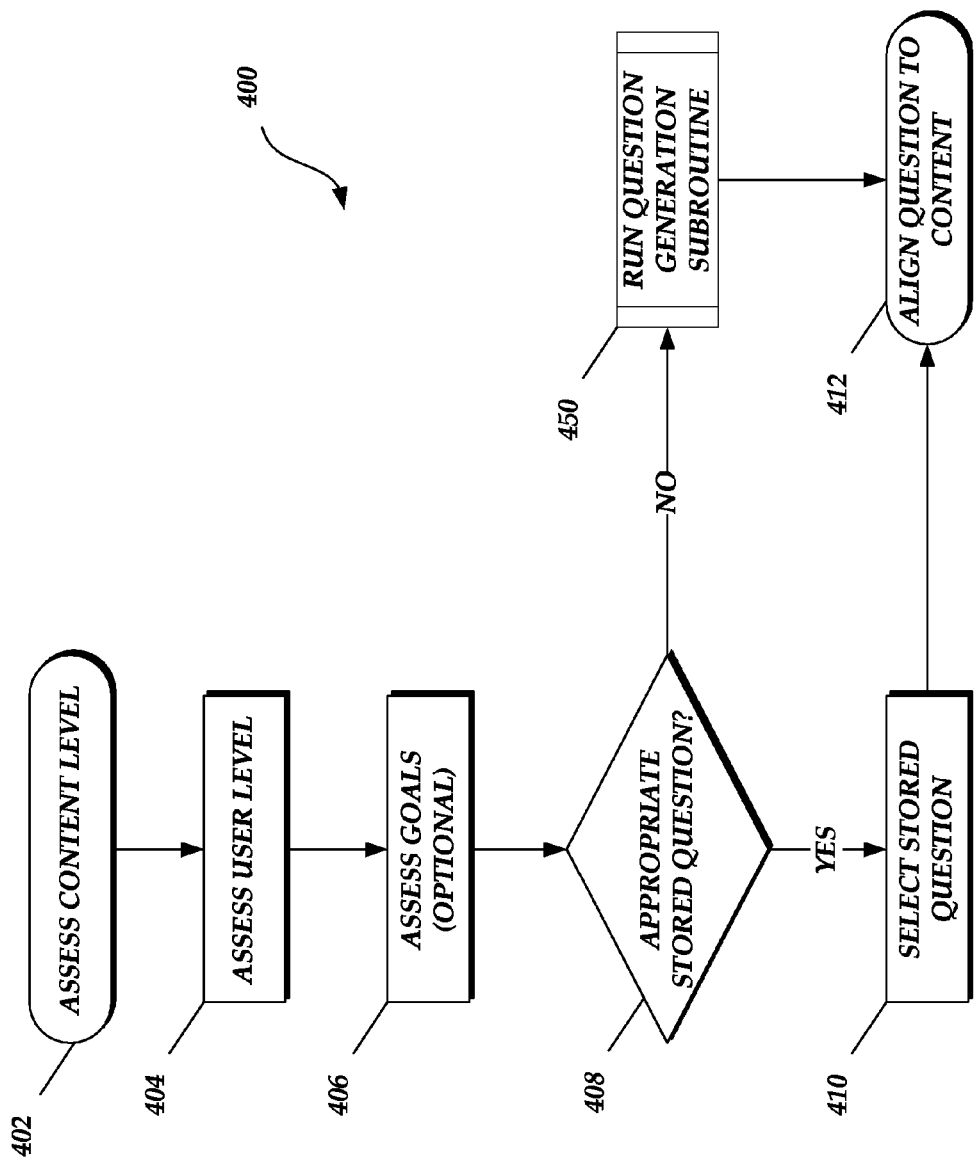
FIG. 4A is a flow diagram depicting an illustrative routine for selecting a question to be conveyed with a portion of an item of content.

FIG. 4A depicts an illustrative routine 400 that the content question service may follow to obtain a question for a portion of an item of content. In block 402, the content question service may determine the difficulty level of the item of content. This difficulty level may measure how difficult it is for a user to understand the item of content. For items of content that include verbal portions (e.g., spoken or displayed text, such as an audiobook or electronic book), this difficulty level may be assessed by analyzing the text itself. The content question service may use the text of the item of content or a transcript of the item of content (e.g., for audio or video content) to determine its difficulty level using machine techniques. For example, the item of content's Flesch-Kincaid readability level or its Gunning fog index may be used to assess its difficulty. The difficulty level of the item of content may also be determined by an educational standard, age range, or other standard or group for which the item of content is recommended. For example, a short chapter electronic book may be recommended for users who are in the 3rd to 5th grades, or a certain audiobook might be recommended for children from ages four to six. The content question service may also obtain input from a human worker of the human interaction task system. For example, the content question service may ask the human worker to recommend an item of content for a particular age range or grade level, or the content question service may ask the human worker to determine the difficulty of the item of content. It should be noted that the same item of content may be determined to have multiple possible difficulty levels depending on, for example, the number of times it has been conveyed to the user, or a pedagogical purpose for which the item of content is to be conveyed. For example, a user reading an electronic book version of the Shakespeare play Hamlet may be reading it simply to practice basic reading comprehension. Accordingly, Hamlet may have a relatively low difficulty level when read for this purpose. Alternately, Hamlet may be assigned a relatively high difficulty level if it has been read more than once by the user, or the user is reading to improve his or her skills at more challenging question tasks. The next time the user reads the electronic book of Hamlet, the difficulty level may be increased, such that questions about scansion, meter, and other more challenging question tasks may be selected.

In block 404, the content question service may assess the user's skill level. Generally described, the user's skill level represents how likely the user is to understand an item of content of a particular difficulty level. In some embodiments, the user's skill level is measured by his or her performance on one or more question tasks. For example, if a user gets several questions having a question task correct, then the user's skill level for that question task may be increased. On the other hand, if a user gets several questions having a particular question task incorrect, the user's skill level for that question task may be decreased. The user's skill level may also (or instead) be measured by the user's age, education, or some other metric. In some embodiments, the user's skill level is specified by the user or by another individual, such as the user's parent, guardian, or teacher. For example, a user's parent might indicate that the user is thirteen years old, or a teacher might indicate that the user reads at an eighth-grade level.

In block 406, the content question service may assess any goals that the user may have. Generally described, goals may be used to select question tasks for a user. For example, a user may wish to improve at a particular question task. Accordingly, questions including that particular question task may be selected or generated by the content question service until the user reaches his or her desired skill level for that question task, e.g., by answering questions based on that question task correctly. Goals may also be determined by the content question service. For example, the content question service may determine that a user needs to have a certain skill level for a particular question task such that the user's skill level meets an educational standard, or is at least equal to the skill level of the user's peers for that question task. Alternately, goals may be specified by another individual, such as the user's parent, guardian, teacher, school administrator, etc. For example, goal skill levels for question tasks that relate to an educational standard promulgated by a governmental body (such as a school board or state department of education) or other educational organization may be provided to the content question service.

In block 408, the content question service may determine if an appropriate question for the portion of the item of content has been stored or previously generated by the content question service. An appropriate question may be a question that matches the portion of the item of content and one or more of the item of content's difficulty level; the user's skill level; and the goals for the user, as determined in blocks 402, 404, and 406, respectively. For example, an appropriate question may be a question that tests a question task for which the user has indicated a desire to improve by setting a goal, as identified in block 406. The content question service may determine whether an appropriate question is accessible through a network question resource 104 or in a question data store 112 local to the content question server. If such a question is available, the stored question may be selected to be conveyed in block 410. If no such question is available, the content question service may generate an appropriate question by following the question generation subroutine 450. Those skilled in the art will appreciate that in some embodiments, the content question service does not search for a previously stored question, and simply generates one or more questions for the portion of the item of content by following the question generation subroutine 450.

In some embodiments, a stored question may be available for the portion of the item of content, but the question may be deemed unsatisfactory by the content question service. For example, the stored question may be a pre-generated question that has received a user rating that does not satisfy a threshold value. If the question's user rating does not satisfy the threshold value, then the content branching service may, in block 408, ignore the stored question and determine that no appropriate stored question is available for the portion of the item of content. Thus, in some embodiments, only questions having a user rating that satisfies a threshold are obtained for the portion of the item of content.

The content question service may then align the question to the portion of the item of content in block 412. In some embodiments, the content question service causes the question to be conveyed immediately after the portion of the item of content for which the question is generated is conveyed. However, in other embodiments, the generated question may be conveyed before its respective portion of the item of content is conveyed or after its respective portion of the item of content is conveyed. For example, a question asking a user to predict what may happen next in an item of content may be conveyed before the portion of the item of content for which the question was generated. Alternately, several questions about several portions of an item of content may be conveyed as a quiz after the portions of the item of content are conveyed. For example, questions about portions of an item of content may be conveyed a week, month, or year after the item of content has been conveyed. In this way, the content question service may test the user's retention and memory of the item of content. Other ways of aligning questions to portions of item of content are possible and within the scope of this disclosure.

Figure 4B:
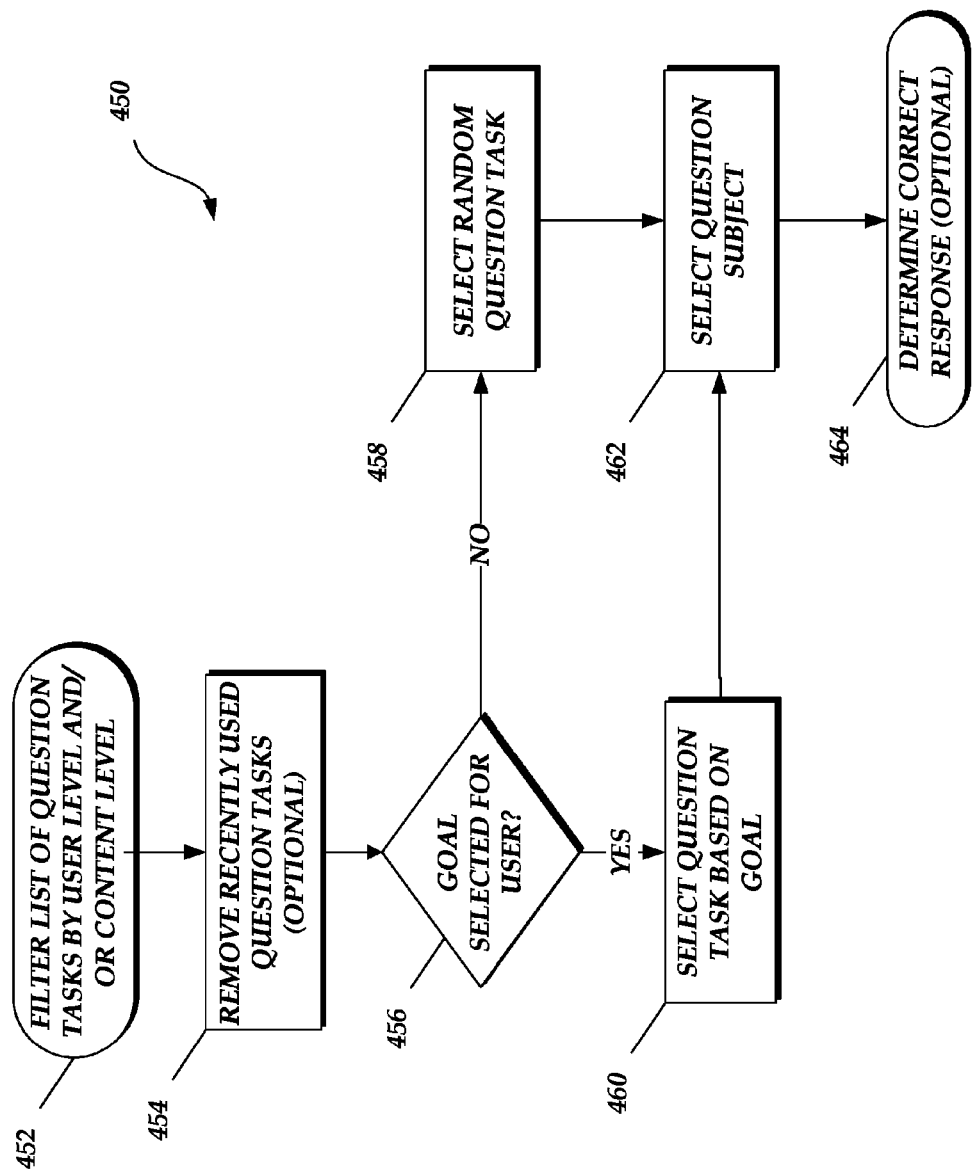
FIG. 4B is a flow diagram depicting an illustrative subroutine for generating a question to be conveyed with a portion of an item of content.

FIG. 4B depicts an illustrative question generation subroutine 450. This question generation subroutine may be used to generate questions for one or more portions of an item of content. In block 452, the list of question tasks may be filtered by the user's skill level and/or the item of content's difficulty level. This filtering may be used to prevent the content question service from conveying questions that would be too difficult or too easy for a user, or that would be unexpectedly difficult or easy given the difficulty level of the item of content. An example will prove illustrative. The user may be a young child just learning to read, and the item of content may be an electronic children's book with simple, monosyllabic words and many pictures. It might be inappropriate to convey questions to the user about the scansion of a portion of the electronic book, as scansion is a subject typically taught in high school English courses in which students analyze difficult poems or verse plays. Accordingly, selecting a question task asking the user to analyze the scansion of the book might be inappropriate for a child learning to read by reading an electronic children's book, and so question tasks about scansion (or other difficult question tasks) may be removed from consideration and not used to generate a question.

As discussed above, an item of content may have multiple difficulty levels, depending on, for example, how many times the item of content has been conveyed, or a pedagogical purpose or audience for which the item of content is to be conveyed. Returning to an above example, an electronic book of the Shakespeare play Hamlet may be conveyed to junior high students to help them practice more basic reading skills, such as reading comprehension. Hamlet may also be conveyed at a higher difficulty level to advanced high school students, such that question tasks related to scansion, meter, and other more challenging topics may be selected.

In block 454, the content question service may optionally remove one or more question tasks recently used to generate questions. Removing recently used question tasks may advantageously be performed to keep questions fresh and to prevent the user from having to repeatedly answer questions involving the same question task. For example, if a vocabulary question is generated about a portion of an item of content, the content question service may not generate or convey another question involving a vocabulary question task until several portions of the item of content later.

In block 456, the content question service may determine if a goal has been selected for a user. As discussed above with respect to block 406 in FIG. 4A, a goal for a user may generally relate to improving the user's skill with a particular question task or set of question tasks. Questions including that question task or set of question tasks may be generated and conveyed to the user until the user meets a certain goal skill level (e.g., the user gets a certain percentage of questions including that question task correct).

In block 458, if no goal has been set for the user, the content question service may select a question task at random from the list of question tasks remaining after filtering the list of question tasks in block 452 and optionally removing any recently used question tasks in block 454.

If a goal has been set for the user for a particular question task or set of question tasks, the content question service may select a question task based on the goal in block 460. For example, the content question service may select a question task for which the user has a below average skill level compared to the user's peers, or for which the user has a skill level below a goal skill level. Alternately, the content question service may receive a user's selection of a question task based on a goal that the user has set for himself or herself. For example, the user may wish to improve his or her proficiency in a foreign language. Accordingly, the user may select a foreign language question task.

In block 462, the content question service may select a question subject in the portion of the item of content. As discussed above, a question subject may be a word, phrase, sentence, mathematical expression, number, image, video clip, audio clip, or other discrete entity in a portion of an item of content about which a question may be asked. A non-exhaustive list of example question subjects and their respective question tasks is provided herein:

| Area | Question Task | Question Subject |
|---|---|---|
| Language Arts | Choose the correct definition | Word(s) |
| | Choose a synonym/antonym | Word(s) |
| | Identify a sentence type (declarative, interrogative, etc.) | Sentence |
| | Identify a rhyme | Words |
| | Identify a meter | Sentence/verse |
| | Identify a metaphor or simile | Phrase |
| Reading | Answering W-word questions (who, what, when, where, why) | Word(s), phrase, or sentence |
| | Point of view (first person, third person) | Portion of item of content |
| | Sequencing events (first, then, finally) | Portion of item of content |
| | Describing an object or action (identifying adjectives or adverbs) | Word(s) (e.g., noun and adjective) |
| | Describing a mood of the portion of the item of content | Word(s) that may indicate mood, e.g., cheerful, crying |
| Math | Arithmetic (adding, subtracting, multiplying, dividing, taking percentages, finding square roots, etc.) | Numbers or mathematical expressions in item of content |
| | Algebra (factoring polynomials, solving equations, finding roots) | Algebraic expression in the item of content |
| Geography | Identify a capital | Word(s) corresponding to state or country |
| Science | Describe an animal (furry, scaly, big, small, sound animal makes) | Word(s) corresponding to an animal |
| | Describe the weather | Word(s) indicating weather (e.g., lightning, sunshine) |
| Foreign language | Translate a word, phrase, or sentence in a foreign language item of content into the user's native language | Word(s), phrase, or sentence |
| | Translate a word, phrase, or sentence in an item of content in the user's native language into a foreign language | Word(s), phrase, or sentence |

As discussed above, question subjects in a portion of an item of content may be identified with machine techniques, such as named entity extraction, natural language processing, semantic analysis, and other known techniques. Question subjects may also be labeled or tagged as question subjects by an author or publisher of the item of content. Additionally, a human worker of the human interaction task system may label or tag a question subject in a portion of the item of content. With a question task and question subject selected, the content question service may generate a question having a particular question form, such as multiple choice, true/false, fill-in-the-blank, short answer, free response, essay, or other forms of questions about the item of content. Other question forms are possible and within the scope of this disclosure. Those skilled in the art will also recognize that a question subject may be chosen before a question task, such that the selection of the question subject in block 462 may constrain the selection of the question task in either block 458 or block 460.

In block 464, the content question service may optionally determine the correct answer to the question it generates. In some embodiments, the content question service analyzes the item of content itself to determine the correct answer to the question. As an example, a question may ask a user to identify a type of sentence in the portion of the item of content. If the sentence ends in a question mark, the content question service may determine that the sentence is an interrogative sentence. Thus the correct response to the question generated would be "interrogative." In another example, a question may ask a user to identify an adjective that describes a noun in the portion of the item of content. The content question service may use natural language techniques to identify a noun and an adjective that modifies the noun. For example, a page in an electronic book may read, "The Rhinos were wearing their yellow helmets." The question subject may be "yellow helmets," and the question might be, "What color helmets are the Rhinos wearing?" The answer to this question would be "yellow," since the adjective "yellow" modifies the noun "helmets." In yet a further example, the content question service may identify a sequence of events in an item of content based on words such as "first," "then," and "finally." The user may be asked to sequence these events. Still other computerized methods of determining a correct response to a question are possible. For example, for a foreign language question task in which the user is asked to translate a word, phrase, or sentence in the item of content into another language, the content question service may use machine translation techniques known in the art to determine a correct response.

In other embodiments, the content question service may consult a knowledge base maintained by a question data store that includes information that may be used to determine the answers to questions. For example, the question data store may maintain a list of state or national capitals and the list of states and countries to which those capitals correspond. A user's response may be checked against the list to determine whether or not the user's response is correct. In another example, the question data store may include a dictionary and/or a thesaurus. The user may be asked to provide a definition, a synonym, or an antonym of a vocabulary word in the portion of the item of content. One or more correct responses may be determined from the dictionary or thesaurus.

Those skilled in the art will appreciate that in some embodiments a question may be generated for which there is no one correct response, or for which determining a correct response may be difficult for a computer. Accordingly, the content question service may not determine a correct response to a generated question in all cases. Instead, the content question service may generate a question, receive a response from the user through the user's computing device, and transmit the response to another user computing device or a server computing device for human analysis, such as by the user's parent or teacher, or by a human worker of the human interaction task system.

Figure 5:
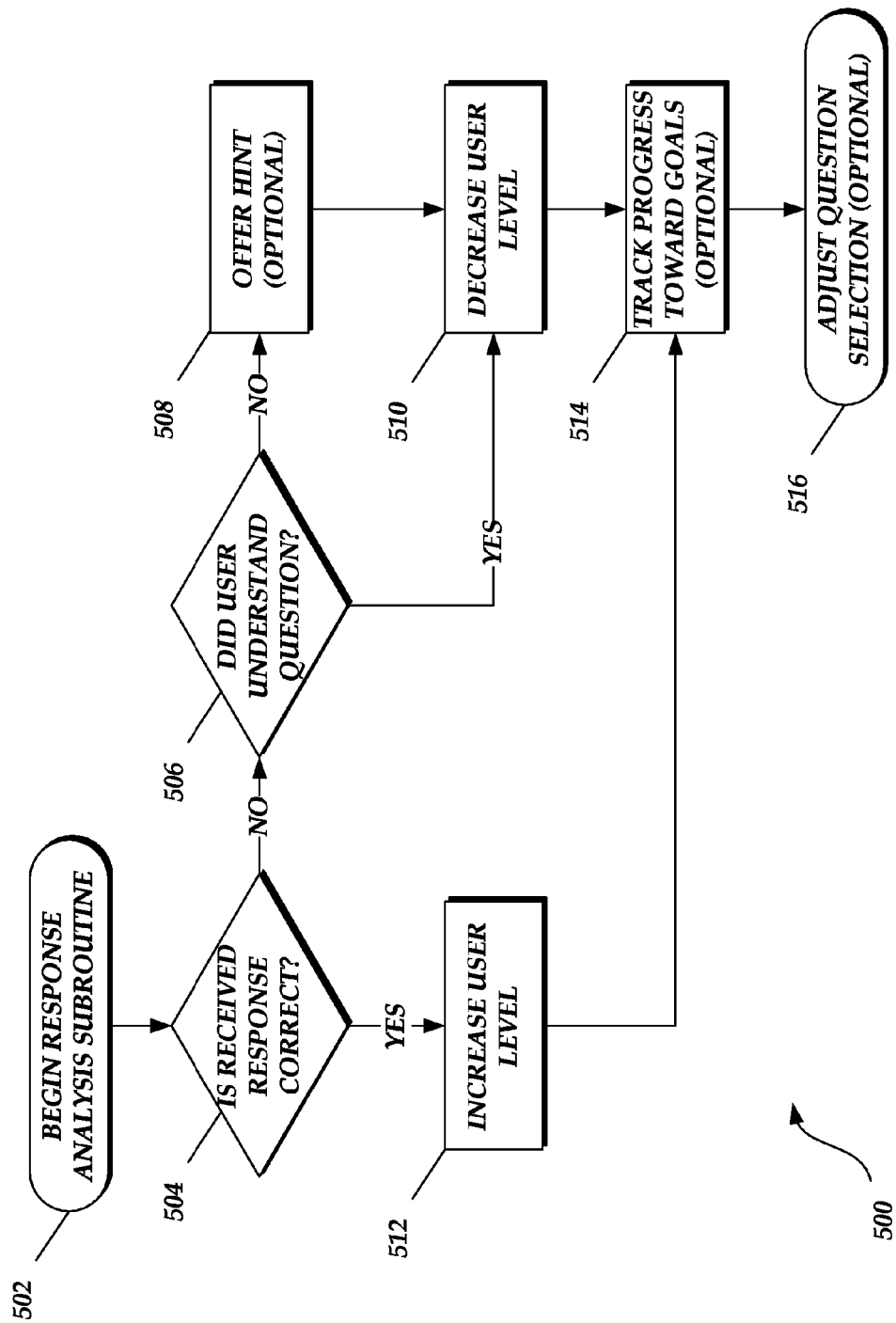
FIG. 5 is a flow diagram depicting an illustrative routine for analyzing a user's response to a question conveyed to the user.

FIG. 5 depicts an illustrative routine 500 for analyzing a user's response to a question conveyed by the content question service. The illustrative routine 500 may begin in block 502 upon receiving a response by the user. As discussed above, a response may be received by the content question service through a user computing device. For example, the user may interact with an element of a visual user interface displayed on a display screen or touchscreen to indicate a response, or the user may speak his or her response into a microphone of his or her user computing device.

In block 504, the content question service may determine whether the user's response is substantially correct. In some embodiments, the user's response is compared to a correct response as determined by the content question service. If the user's response matches the correct response, it may be deemed a correct response.

In some embodiments, the received response need not exactly match the correct response. The received response may be substantially equivalent to the correct response and may be deemed a correct response. This aspect may be especially advantageous for free response and fill-in-the-blank questions, where the user may not be presented with any response choices and must come up with a response on his or her own. For example, a user may be asked to speak his or her response to a conveyed question, and speech recognition techniques known in the art may be used to convert the user's spoken response into data to be compared to the correct response. However, the conversion may not be entirely accurate. Accordingly, the user may be deemed to have spoken the correct response if the converted speech is close to the correct response. For example, the correct answer to a question may be the word "apple." The user may speak the word "apple," but it may be misinterpreted as the words "bad pull" by a speech recognition routine. The content question service may recognize that "bad pull" sounds like "apple," and may conclude that the user spoke the correct response even if the user's utterance was mis-transcribed.

Other examples of equivalently correct answers may vary by question task. For example, for a math question involving fractions, the content question service may determine that the decimal equivalent of the correct response is substantially equivalent to the correct response. In another example, a user may be asked to fill in the blank of a sentence with a vocabulary word. A synonym of that vocabulary word may be deemed by the content question service to be substantially equivalent to the correct response. For example, the correct response may be "tired," while a substantial equivalent to that response may be "exhausted."

If the response received by the content question service is incorrect (e.g., not substantially equivalent to the correct answer), the content question service may attempt to determine if the user understood the question in block 506. In some embodiments, when a question is conveyed to the user, the user may be provided with a response choice corresponding to "I don't know" or "I don't understand," or may simply indicate that he or she does not understand without being provided such a response choice. If the user makes such a response, the user may be deemed to have not understood the question. In other embodiments, the user is deemed to have not understood the question if he or she repeatedly provides an incorrect response to a question. In still further embodiments, the user is deemed to have not understood the question if he or she provides a non-sensical response, e.g., if the user responds with a number for a question involving a vocabulary question task.

If the content question service determines that the user did not understand the conveyed question, the content question service may convey a hint about the question to the user in block 508. As with the questions themselves, hints may be dynamically generated by the content question service. The nature of the hint may vary based on the form of the question or the question task tested by the question. For example, a hint for a multiple choice question may entail eliminating one or more incorrect responses, so that the user is more likely to select a correct response from the remaining responses. A hint for a vocabulary question may include a synonym for the correct response, as determined by a knowledge base stored in electronic form by the question data store. Still other types of hints are possible.

Regardless of whether the user understood the conveyed question, the user's skill level may be decreased in block 510 as a consequence of answering the question incorrectly and/or not understanding the question. For example, the user's skill level for a question task tested by the conveyed question may be lowered or otherwise adjusted to reflect a weaker skill level for that question task. In block 512, on the other hand, the user's skill level for a question task tested by the conveyed question may be increased or otherwise adjusted to reflect a stronger skill level for that question task if the user answered the question correctly.

In block 514, the user's progress toward one or more goals may be tracked in response to a decrease in the user's skill level for a question task in block 510 or an increase in the user's skill level for a question task in block 512. For example, the content question service may determine if a user's skill level satisfies a goal skill level set for the user, such as whether the user's skill level for the question task is at least equal to that of the user's peers, or if the user's skill level for the question task meets an educational standard. Alternately, the content question service may determine that the user has answered one or more questions based on a particular question task incorrectly. The user's skill level for that question task may have dropped below a goal skill level, such that the user's skill level for that question task is below that of the user's peers or below an educational standard.

Based on the user's progress toward the user's goal skill levels, the content question service may adjust its selection of question tasks in block 516. As discussed above, the content question service may determine that a user is weak in one particular question task, and may select that question task for future questions to be conveyed to the user for extra practice. For example, a user may consistently miss questions about numbers. Accordingly, the content question service may select question tasks about numbers for subsequent questions to be generated and conveyed by the content question service. Alternately, the content question service may determine that a user has performed exceptionally well for a particular question task, and may not select that question task for future questions to be conveyed, as the user may not need any further practice on question tasks in which he or she is already proficient.

Figure 6:
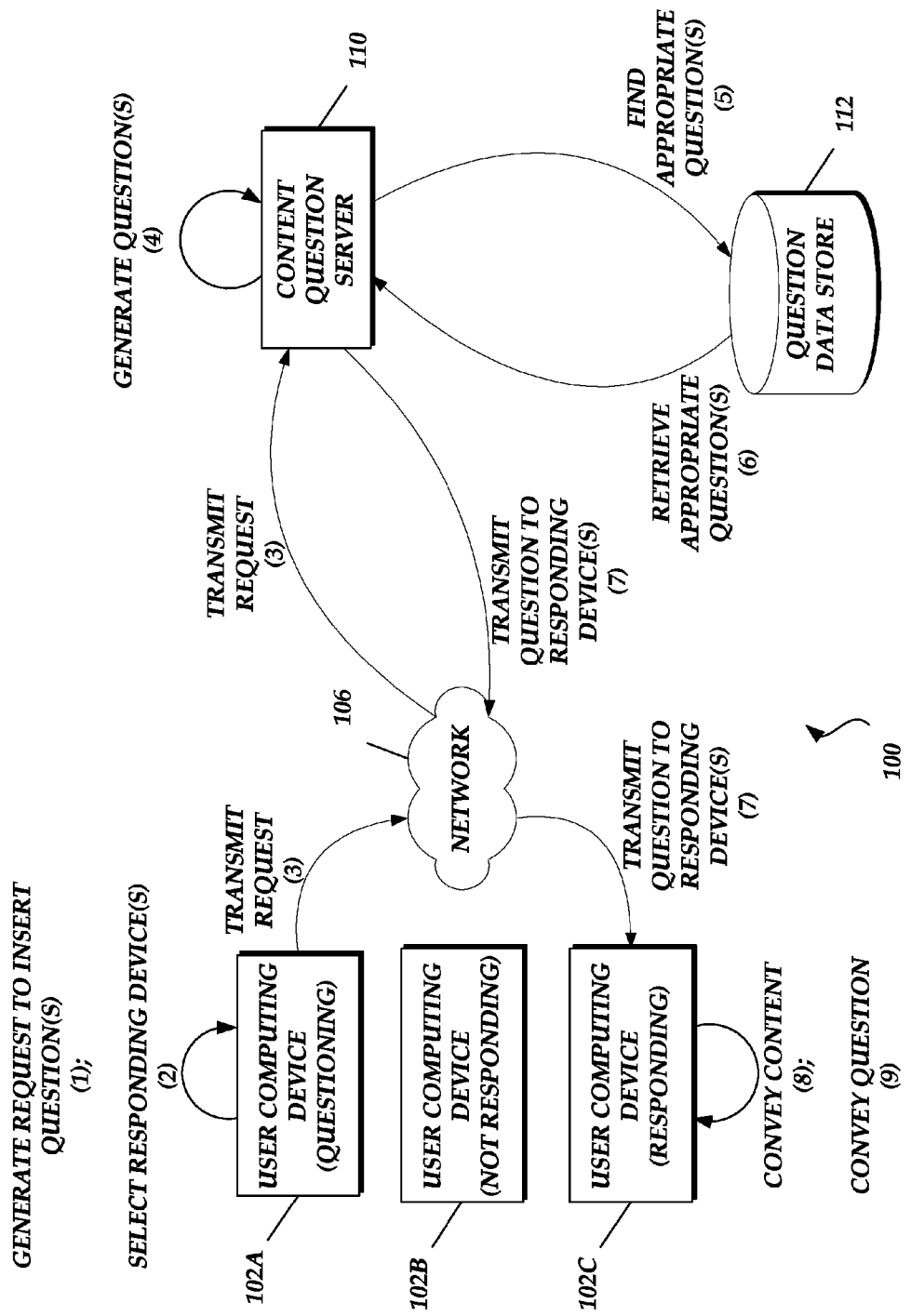
FIG. 6 is a state diagram depicting an illustrative distribution of questions from a content question server to one or more computing devices.

FIG. 6 is state diagram of an illustrative distribution of a question throughout the network environment 100. In one example operation, a user of the questioning user computing device 102A generates a request to have a question conveyed with an item of content (1). The user may designate one or more user computing devices as responding user computing devices (2). Here, user computing device 102C has been designated as a responding user computing device. For example, a teacher using questioning user computing device 102A may designate a user computing device 102C associated with one of his or her students to be a responding computing device. Non-responding user computing device 102B may not be designated as a responding computing device by the questioning user computing device 102A.

The questioning user computing device 102A may then transmit the request to have a question conveyed with the item of content (3) over the network 106 to the content question server 110. The content question server 110 may then generate a question (4) as described above with respect to FIG. 4B. The generated question may then be transmitted (7) over the network 106 to the responding user computing device 102C. As the responding user computing device 102C conveys the item of content (8) for which the questioning user computing device 102A requested the question, the generated question may be conveyed (9) by the responding user computing device 102C. Optionally, the responding user computing device 102C may receive a user's response and transmit that response over the network 106 to either the content question server 110 or to the questioning user computing device 102A.

In a second example operation, a user of the questioning user computing device 102A generates a request to have a question conveyed with an item of content (1). The user may designate one or more user computing devices as responding user computing devices (2). Here, user computing device 102C has been designated as a responding user computing device. For example, a teacher using questioning user computing device 102A may designate a user computing device 102C associated with one of his or her students to be a responding computing device. Non-responding user computing device 102B may not be designated as a responding computing device by the questioning user computing device 102A.

The questioning user computing device 102A may then transmit the request to have a question conveyed with the item of content (3) over the network 106 to the content question server 110. The content question server 110 may then find an appropriate question (5) stored in the question data store 112 as described above with respect to FIG. 4A, blocks 408 and 410. After retrieving the appropriate question (6) from the question data store 112, the content question server 110 may transmit the question (7) over the network 106 to the responding user computing device 102C. As the responding user computing device 102C conveys the item of content (8) for which the questioning user computing device 102A requested a question, the generated question may be conveyed (9) by the responding user computing device 102C. Optionally, the responding user computing device 102C may receive a user's response and transmit that response over the network 106 to either the content question server 110 or to the questioning user computing device 102A.

In a third example operation, the content question server 110 may designate a responding user computing device instead of the questioning user computing device 102A. The content question server may then generate a question (4) or find (5) and retrieve (6) an appropriate question stored in the question data store 112. The generated or retrieved question may be transmitted (7) over the network 106 to the responding user computing device 102C. As the responding user computing device 102C conveys the item of content (8) for which the questioning user computing device 102A requested a question, the generated question may be conveyed (9) by the responding user computing device 102C. Optionally, the responding user computing device 102C may receive a user's response and transmit that response over the network 106 to either the content question server 110 or to the questioning user computing device 102A.

Three example operations of the content question service are described herein, but those skilled in the art will recognize that other operations are possible and within the scope of the present disclosure. For example, in some embodiments, a questioning user computing device 102A generates a question and transmits the question over the network 106 directly to the responding user computing device 102C. In other embodiments, the questioning user computing device 102A generates a question or requests that a question be generated by the content question server 110, but does not designate responding user computing devices. Instead, another user may designate his or her own user computing device as a responding user computer device 102C, and may have the generated question transmitted to his or her user computing device by either the questioning user computing device 102A or the content question server 110. In still other embodiments, the content question server 110 may, upon the request of questioning user computing device 102A, retrieve a question from a network question resource 104 (not pictured) and transmit that question over the network 106 to a responding user computing device 102C.

Figure 7:
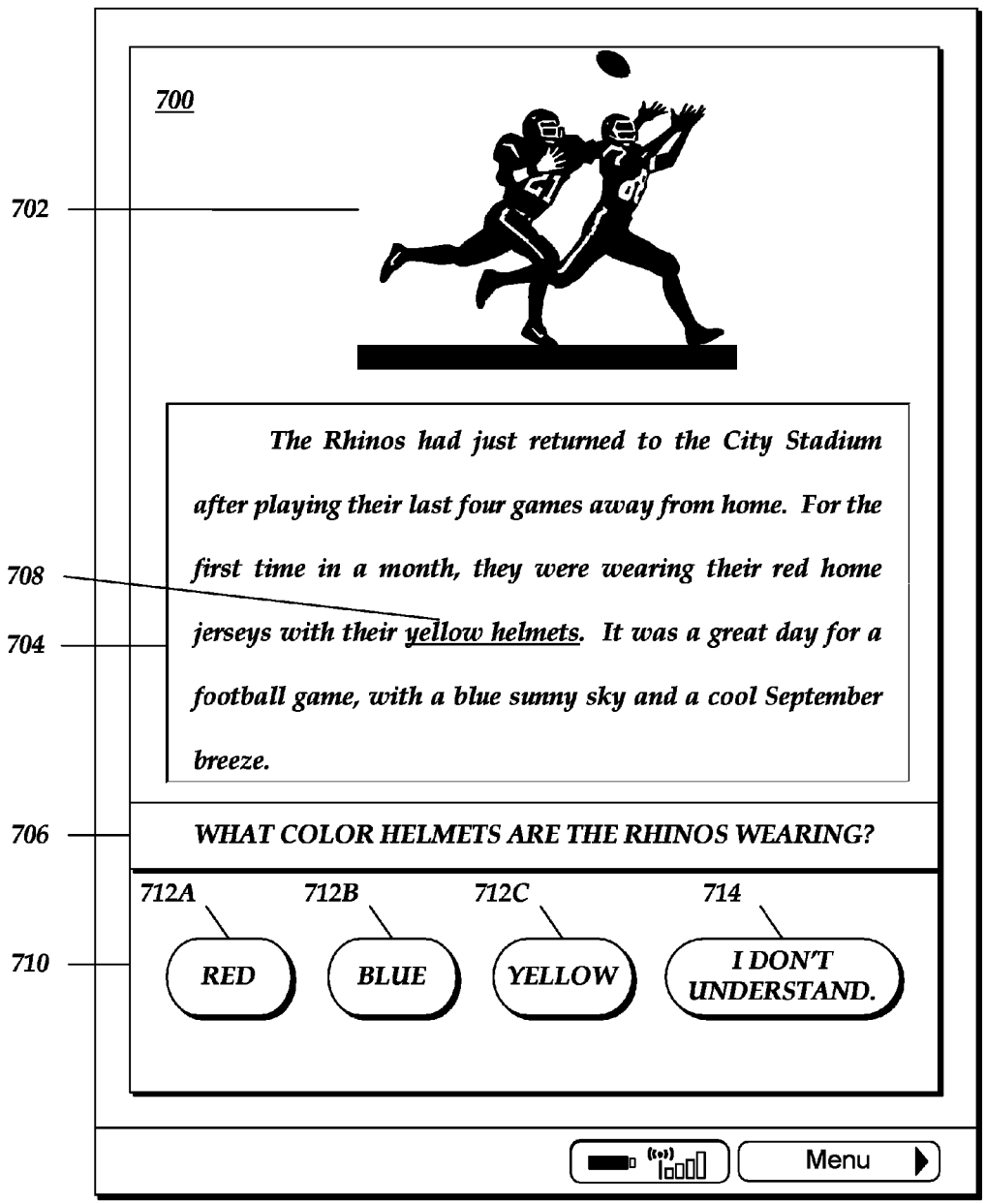
FIG. 7 is a pictorial diagram depicting an illustrative user interface for conveying a question about a portion of an item of content and for receiving a user's response to the question.

FIG. 7 is a pictorial diagram of an example user interface 700 that may be displayed on a user computing device and that may convey an item of content and/or a question about the item of content. The user interface 700 may include a visual content pane 702 in which a portion of an item of content that includes visual content may be displayed. For example, a video clip, image, or animation may be displayed in the visual content pane 702.

The user interface 700 may also include a textual content pane 704. In some embodiments, the textual content pane 704 displays a portion of an electronic book. In other embodiments, the textual content pane 704 displays textual content that is synchronized to audio content conveyed by the user computing device. More information on synchronizing textual content to audio content may be found in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entireties.

A question pane 706 may be included in the user interface 700. The question pane 706 may convey the question obtained by the content question service in visual format. As discussed above, the question may also be conveyed in audio format, e.g., by directing audio output through speakers or headphones associated with a user computing device. In some embodiments, the question obtained by the content question service and displayed in question pane 706 relates to a particular question subject, underlined here as question subject 708, the words "yellow helmets."

To receive a user's response to the conveyed question, a response pane 710 may be provided. The user interface elements present in the response pane 710 may vary based on the form of the question. For multiple choice questions, the response pane 710 may display response controls 712A-712C, with each response control 712A-712C corresponding to a response. A user may interact with the one or more response controls 712A-712C to provide a response, e.g., by clicking a response control 712A-712C (if on a display screen) or by tapping a response control 712A-712C (if displayed on a touchscreen). The user may also interact with the "I don't understand" control 714 to indicate that he or she does not understand the question, as discussed above with respect to block 506 in FIG. 5.

The user interface elements in the response pane 710 may vary based on the form of the question or the question task. For example, the response pane 710 may include a blank for a user to fill in if the conveyed question is a fill-in-the-blank question. The response pane 710 may also include space for a user to draw, write, or type his or response. Additionally, in embodiments where the user speaks his or her response into a microphone of the user computing device, the response pane 710 may not be displayed at all, or may contain no elements if displayed.

Figure 8:
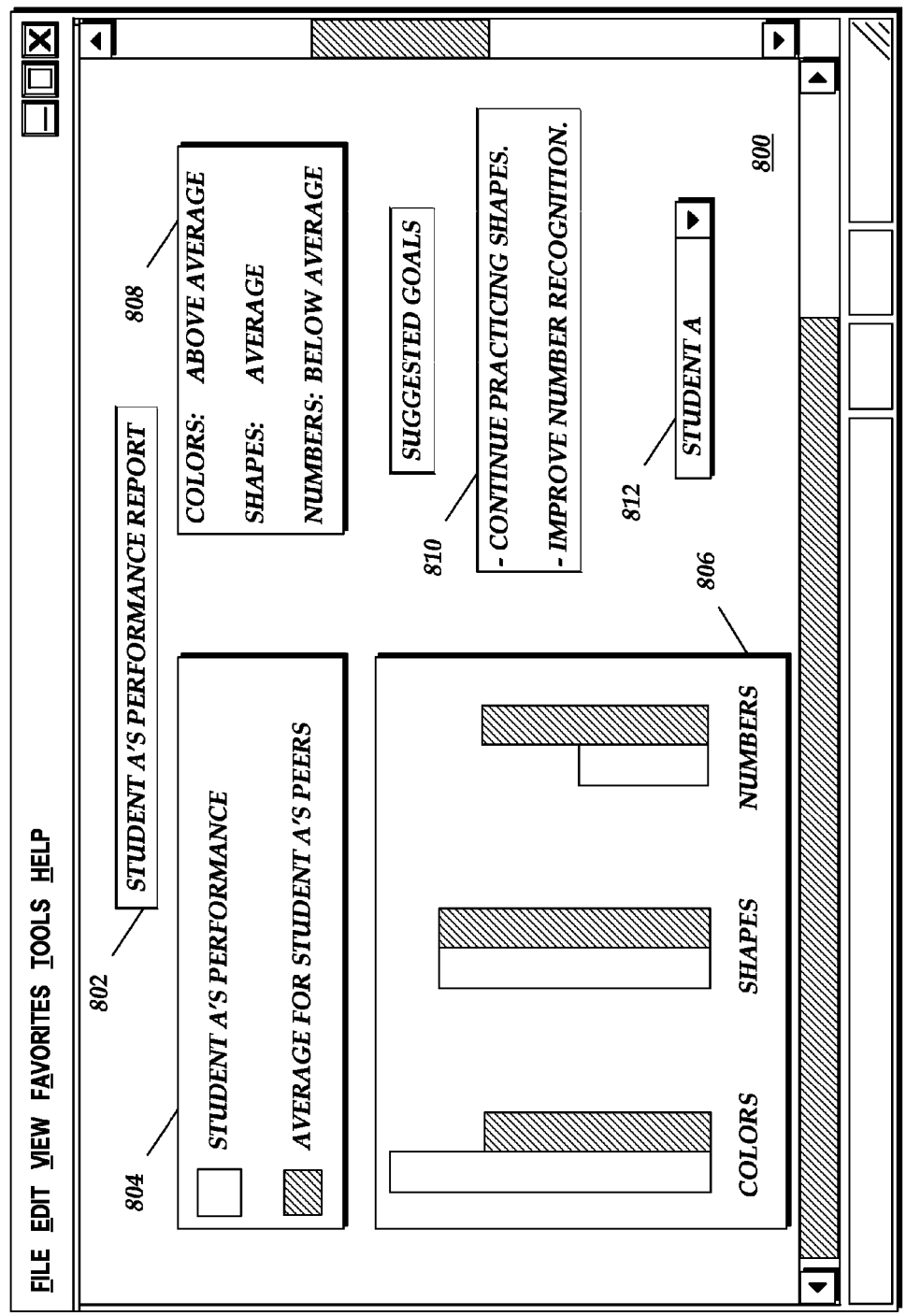
FIG. 8 is a pictorial diagram depicting an illustrative user interface for tracking a user's responses to questions about a portion of an item of content.

FIG. 8 is a pictorial diagram of an example user interface 800 that may be used to display information about a user's skill level with one or more question tasks. In embodiments where the content question service is embodied entirely in a user computing device, this user interface may be generated by software installed on the user computing device. The user interface 800 may also be displayed as part of a content page hosted on the content question server. The content page may be accessed by a user through a network browser installed on his or her user computing device.

The user interface 800 may include a user indicator 802. The user indicator 802 may simply indicate which user's profile is being displayed. As discussed above, a profile may include information on the user's skill level for one or more question tasks, as well as any goal skill levels set for the user.

The user's skill level for one or more question tasks may be indicated graphically in legend pane 804 and graph pane 806. For example, the user's skill level for one or more question tasks may be displayed as a bar in a bar graph, with the skill level of the user's peer group (or another type of goal skill level) for each question task may be displayed next to the bars representing the user's skill level. In other embodiments, the user's skill level with a particular question task may instead be tracked over time using a line graph, with time as the horizontal axis and a skill level (such as a percentage of correct questions) as the vertical axis. Still other ways to represent a user's skill level in graphical format are possible.

The user's skill level for one or more question tasks may also (or instead) be indicated in textual form in skill pane 808. For example, skill pane 808 may list one or more question tasks, and then list the user's skill level for each respective question task. The user's skill level for each question task may be displayed as a percentage or number of questions for which the user provided a correct response; as a comparison of the user's skill level to a goal skill level; or in some other fashion.

The content question service may suggest one or more goals based on a user's skill level for a particular question task. These suggested goals may appear in goal pane 810. In some embodiments, these goals are selected based on a user's performance on a particular question task. A user performing at or below a goal skill level for a question task may be encouraged to practice that question task, for example.

The user menu 812 may provide a selection of a number of users. In some embodiments, the list of users in user menu 812 corresponds to users of responding user computing devices as shown in and described with respect to FIG. 6. In other embodiments, the list of users in user menu 812 corresponds to a list of users of a single user computing device. When a user is selected from the user menu 812, that user's skill levels and goals may be displayed in the user interface 800.

In some embodiments, the user menu 812 enables the selection of multiple users with particular skill levels or relationships (e.g., family members, classmates, etc.). If multiple users are selected, the skill levels and goals for some or all of those users may be displayed in graph pane 806, skill pane 808, and goal pane 810. For example, the user menu 812 may be used to obtain a selection of all students in a class who have a skill level for a particular question task that is below a goal skill level. In this respect, information regarding these students who have unsatisfactory skill levels may be quickly and conveniently identified.

Though aspects of the present disclosure have been discussed in an educational environment, those skilled in the art will appreciate that other implementations of the content question service are possible. For example, the content question service may be implemented as a network-based gaming service, where users receive incentives such as points or virtual currency for answering questions conveyed with items of content. Users may compete to have the highest skill level for a particular question task, or form teams whose skill levels may be compared to those of users on other teams or to one or more goal skill levels. Multiple users of the content question service may be provided with the same questions about an item of content, and race to answer the questions first or to answer the most questions correctly. The user interface 800 in FIG. 8 may be used to implement a "leaderboard" so that users may see where they stand with respect to other users in terms of skill levels for question tasks, or in terms of percentages of questions answered correctly. Still other network-based gaming service implementations of the content question service are possible.

The content question service may also be implemented as a network-based club or service for discussing items of content, such as an electronic book club. For example, as shown in FIG. 6, a user of the questioning user computing device 102A may post a question on a social networking community's content page. The question may be distributed to and conveyed by user computing devices associated with other users in the user's social graph. The user computing devices associated with these users may accordingly be designated as responding user computing devices, and questions may be provided to these designated user computing devices at the behest of the user of the questioning user computing device 102A. Still other applications and implementations of the content question service are possible.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z" □ unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   determining, by a computing system comprising one or more computing devices, a difficulty level of an item of content, wherein the difficulty level is determined based on an analysis of at least a portion of text of the item of content using machine techniques;
   determining, by the computing system, a skill level of a user with respect to the item of content, wherein the skill level is determined based at least in part on retrieved information from a stored user profile associated with the user;
   selecting, by the computing system, a question task fitting at least one of the difficulty level of the item of content or the skill level of the user, wherein the question task represents a skill to be tested by a question to be generated;
   analyzing, by the computing system, the portion of text of the item of content to identify a question subject within the portion, wherein the portion of text is analyzed using at least one of natural language processing or semantic analysis;
   generating, by the computing system, a question about the item of content and a correct answer to the question, wherein the question is generated based at least in part on the question task, the question subject and the portion of text; and
   generating, by the computing system, a user interface for display, wherein the user interface includes display of (a) at least the portion of text of the item of content, (b) the question generated by the computing system, and (c) two or more selectable controls that each display a different response to the question, wherein one of the two or more selectable controls displays the correct answer generated by the computing system.

2. The computer-implemented method of claim 1 further comprising receiving a selection of a language; and wherein the generated question is included in the user interface in the selected language.

3. The computer-implemented method of claim 2, wherein the selected language is different from the item of content's language.

4. The computer-implemented method of claim 1 further comprising receiving a user's response to the generated question.

5. The computer-implemented method of claim 4 further comprising adjusting, by the computing system, the user's skill level based on the received user's response.

6. The computer-implemented method of claim 5 further comprising:
   making a comparison, by the computing system, between the adjusted skill level of the user and a skill level of one or more members of a peer group of the user; and
   based at least in part on the comparison, suggesting, by the computing system, one or more goals for the user.

7. The computer-implemented method of claim 1 further comprising:
   generating, by the computing system, a hint for the generated question; and
   including, by the computing system, the generated hint in the user interface.

8. The computer-implemented method of claim 1, wherein the difficulty level of the item of content is determined by at least one of:
   an educational standard for which the item of content is recommended;
   a Flesch-Kincaid readability score of the item of content; or
   a Gunning fog index of the item of content.

9. The computer-implemented method of claim 1 further comprising identifying, by the computing system, a question task from which a previously conveyed question was generated; wherein the selected question task is not the identified question task.

10. The computer-implemented method of claim 1, wherein
    analyzing the portion of text of the item of content comprises identifying, in the portion of text of the item of content, a noun and an adjective that modifies the noun, wherein the generated question includes the noun and the generated answer includes the adjective.

11. The computer-implemented method of claim 1, wherein the question subject within the portion of text is further identified based at least in part by applying named entity extraction.

12. A system comprising:
    an electronic data store configured to at least store content; and
    a computing system comprising one or more hardware computing devices executing specific computer-executable instructions, said computing system in communication with the electronic data store and configured to at least:
       determine a difficulty level of an item of content, wherein the difficulty level is determined based on an analysis of at least a portion of text of the item of content using machine techniques;
       determine a skill level of a user with respect to the item of content, wherein the skill level is determined based at least in part on retrieved information from a stored user profile associated with the user;
       select a question task fitting at least one of the difficulty level of the item of content or the skill level of the user, wherein the question task represents a skill to be tested by a question to be generated;
       analyze the portion of text of the item of content to identify a question subject within the portion, wherein the portion of text is analyzed using at least one of natural language processing or semantic analysis;
       generate a question about the item of content and a correct answer to the question, wherein the question is generated based at least in part on the question task, the question subject and the portion of text; and
       generate a user interface for display, wherein the user interface includes display of (a) at least the portion of text, (b) the question generated by the computing system, and (c) two or more selectable controls that each display a different response to the question, wherein one of the two or more selectable controls displays the correct answer generated by the computing system.

13. The system of claim 12, wherein the computing system is further configured to:
    receive a selection of a language; and
    wherein the generated question is included in the user interface in the selected language.

14. The system of claim 13, wherein the selected language is different from the item of content's language.

15. The system of claim 12, wherein the computing system is further configured to receive a user's response to the generated question.

16. The system of claim 15, wherein the computing system is further configured to adjust the user's skill level based on the received user's response.

17. The system of claim 16, wherein the computing system is further configured to:
make a comparison between the adjusted skill level of the user and a skill level of one or more members of a peer group of the user; and
based at least in part on the comparison, suggest one or more goals for the user.

18. The system of claim 12, wherein the computing system is further configured to:
generate a hint for the generated question; and
include the hint for display in the user interface.

19. The system of claim 12, wherein the difficulty level of the item of content is determined by at least one of:
an educational standard for which the item of content is recommended;
a Flesch-Kincaid readability score of the item of content; or
a Gunning fog index of the item of content.

20. The system of claim 12, wherein the computing system is further configured to identify a question task from which a previously conveyed question was generated; wherein the selected question task is not the identified question task.

21. A computer-readable, non-transitory storage medium storing computer executable instructions that, when executed by one or more computing devices, configure the one or more computing devices to perform operations comprising:
determining a difficulty level of an item of content, wherein the difficulty level is determined based on an analysis of at least a portion of text of the item of content using machine techniques;
determining a skill level of a user with respect to the item of content, wherein the skill level is determined based at least in part on retrieved information from a stored user profile associated with the user;
selecting a question task fitting at least one of the difficulty level of the item of content or the skill level of the user, wherein the question task represents a skill to be tested by a question to be generated;
analyzing the portion of text of the item of content to identify a question subject within the portion, wherein the portion of text is analyzed using at least one of natural language processing or semantic analysis;
generating a question about the item of content and a correct answer to the question, wherein the question is generated based at least in part on the question task, the question subject and the portion of text; and
generating a user interface for display, wherein the user interface includes display of (a) at least the portion of text, (b) the question, and (c) two or more selectable controls that each display a different response to the question, wherein one of the two or more selectable controls displays the correct answer.

22. The computer-readable, non-transitory storage medium of claim 21, wherein the operations further comprise:
receiving a selection of a language; and
wherein the generated question is included in the user interface in the selected language.

23. The computer-readable, non-transitory storage medium of claim 22, wherein the selected language is different from the item of content's language.

24. The computer-readable, non-transitory storage medium of claim 21, wherein the operations further comprise receiving a user's response to the generated question.

25. The computer-readable, non-transitory storage medium of claim 24, wherein the operations further comprise adjusting the user's skill level based on the received user's response.

26. The computer-readable, non-transitory storage medium of claim 25, wherein the operations further comprise:
making a comparison between the adjusted skill level of the user and a skill level of one or more members of a peer group of the user; and
based at least in part on the comparison, suggesting one or more goals for the user.

27. The computer-readable, non-transitory storage medium of claim 21, wherein the operations further comprise:
generating a hint for the generated question; and
including the generated hint in the user interface.

28. The computer-readable, non-transitory storage medium of claim 21, wherein the difficulty level of the item of content is determined by at least one of:
an educational standard for which the item of content is recommended;
a Flesch-Kincaid readability score of the item of content; or
a Gunning fog index of the item of content.

29. The computer-readable, non-transitory storage medium of claim 21, wherein the operations further comprise identifying a question task from which a previously conveyed question was generated; wherein the selected question task is not the identified question task.

* * * * *